Jan. 13, 1970  M. G. BRILLE  3,488,952
APPARATUS FOR ALTERNATIVELY SUPPLYING COMBUSTION PRODUCTS AND
COOLING AIR TO SEPARATE TURBINE WHEELS
Filed Feb. 23, 1968

United States Patent Office 3,488,952
Patented Jan. 13, 1970

3,488,952
APPARATUS FOR ALTERNATIVELY SUPPLYING COMBUSTION PRODUCTS AND COOLING AIR TO SEPARATE TURBINE WHEELS
Maurice G. Brille, Billancourt, France, assignor to Regie Nationale des Usines Renault, Billancourt, and Automobiles Peugeot, Paris, France
Filed Feb. 23, 1968, Ser. No. 707,523
Claims priority, application France, Mar. 7, 1967, 97,802
Int. Cl. F02g 1/06; F02c 3/04, 7/12
U.S. Cl. 60—39.76   3 Claims

ABSTRACT OF THE DISCLOSURE

Gas turbine operating according to the two-cycle process comprising an expansion cycle and a scavenging or cooling cycle, characterised in that it comprises two turbo-engine units each having a separate combustion chamber and each associated with a common compressor, a common rotary distributor directing the compressor output flow alternately to one and the other turbo-engines through their combustion chambers and alternately opening their air inlets permitting the passage of a scavenging or cooling flow drawn by said turbo-compressors.

---

The present invention relates to gas turbines and has specific reference to a gas turbine comprising compression chamber and a compressor, and operating according to a two-cycle process.

In a preceding U.S. patent application 702,744 filed on Feb. 2, 1968, the applicant disclosed a gas turbine in which the power flow is discontinued periodically for inserting a flow of scavenging or cooling air thereinstead. During the scavenging cycle the compressor output is interrupted. Under these conditions, the compressor is liable to "pump" or be damaged.

The present invention consists in using two turbo-engines coupled to a single and common compressor delivering permanently a continuous flow directed by turns to one or the other turbo-engine.

The principal difference with the above-mentioned prior patent application lies in the fact that the system distributing the flow to the turbo-engines consists of a rotary distributor disk so arranged that each turbo-engine receives the power flow during one-half of the cycle, instead of during a random fraction of this cycle, and that each turbo-engine draws the flow of scavenging air during one-half of the cycle, instead of during the complementary fraction of the power cycle.

Preferably, the compressor and both turbo-engines are mounted on a common shaft; the turbo-engines are mounted back-to-back and each turbo-engine has associated therewith a separate combustion chamber having its inherent fuel injection nozzle, and the power regulation is effected as in current practice by varying the fuel pump output.

In order to afford a clearer understanding of this invention reference will now be made to the accompanying drawing illustrating diagrammatically by way of example a gas turbine constructed according to the principle of this invention. In the drawing.

Figure 1:
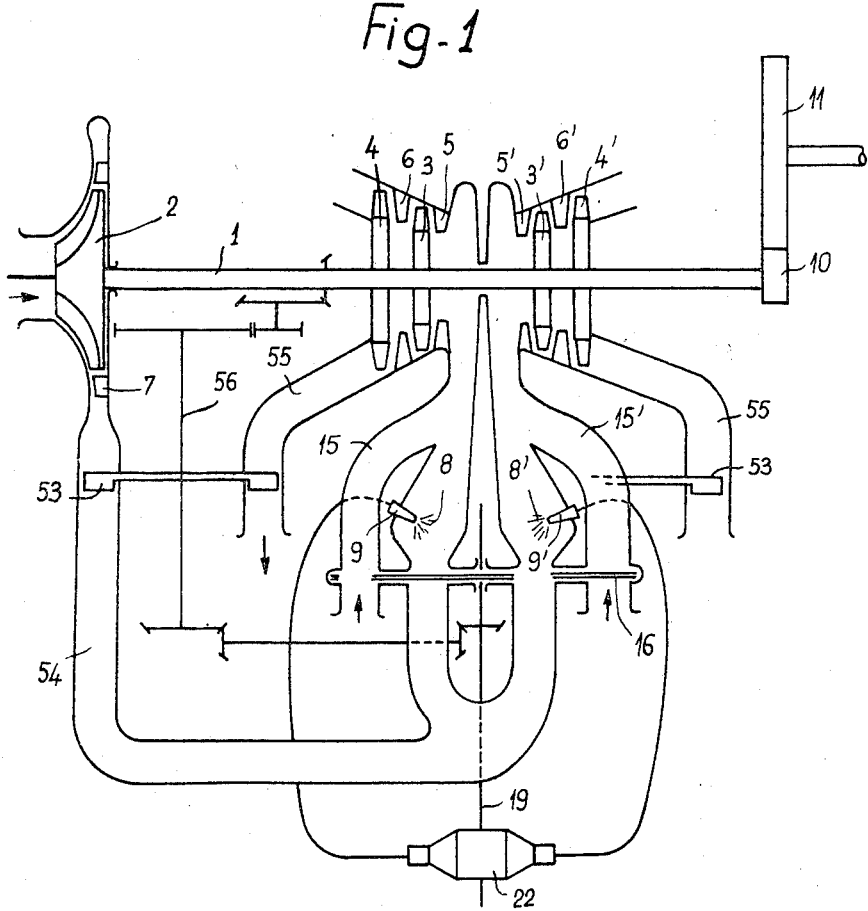
FIGURE 1 is a diagrammatic comprehensive view of the turbine.

Referring first to FIGURE 1, it will be seen that the gas turbine illustrated diagrammatically therein comprises a shaft 1, a compressor 2, a first turbo-engine mounted on this shaft 1, which comprises two wheels 3 and 4, deflector blades 5 and 6, a second turbo-engine comprising corresponding wheels 3' and 4' and corresponding deflector blades 5' and 6' opposite to those of the first turbo-engine. The combustion gas flow or the air flow is introduced into the zone intermediate these two turbo-engines disposed back-to-back.

Figure 2:
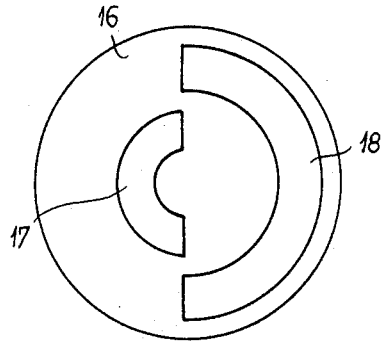
FIGURE 2 is a diagrammatic front view of the rotary distributor.

The air compressed by compressor 2 is forced through a duct 54 divided into two branches leading respectively to two separate combustion chambers 8 and 8' feeding respectively the turbo-engines 3, 4 and 3', 4'; the shaft 1 transmits the torque via a reduction gearing 10, 11; the turbine gases are exhausted through a duct 55 intersected for example by a rotary member 53 for recovering the waste gas energy; disposed between the combustion chambers and the turbo-engines are the scavenging air inlets 15 and 15'; the air and gas stream distribution is controlled by means of a rotary distributor 16 consisting of a disk (FIGURE 2) provided with semi-circular concentric apertures 17, 18 so arranged that the passage is free alternately towards combustion chamber 8' and air inlet 15, and towards combustion chamber 8 and air inlet 15'.

The rotary distributor 16 is driven from shaft 1 through a reduction gearing providing a high reduction ratio, notably through the medium of the shaft 56 rigid with the exhaust-gas recovery rotary member 53, and also shaft 19 driving at the same time the distributor 16 and the fuel pump 22, the latter feeding by turns the fuel injection nozzles 9 and 9'.

I claim:
1. A two cycle gas turbine having a power cycle and a scavenging cycle comprising at least two turbo-engines and their respective combustion chambers, and turbo-engine wheels driven by the output of said combustion chambers, an output shaft operatively connected common to said turbo-engines, a single compressor means, first duct means connecting said compressor to said combustion chambers, second duct means having scavenging air inlets and being connected to each of said turbo-engines downstream of said combustion chambers, distributor means common to both said duct means and adapted to alternately direct the compressor flow towards one and the other turbo-engine through their combustion chambers while alternately opening said air inlets to permit the passage of a stream of scavenging and cooling air into the turbo-engine not receiving said compressor flow, the stream of scavenging air being drawn in by said turbo-engine wheels.

2. A two cycle gas turbine according to claim 1 wherein said output shaft has both said turbo-engine wheels and said compressor means mounted thereon.

3. A two cycle turbine according to claim 1 wherein said output shaft has both said turbo-engine wheels mounted thereon back to back, and the downstream end of said second duct means feeding combustion gas flow and scavenging air flow intermediate said turbo-engine wheels from said combustion chambers.

References Cited

UNITED STATES PATENTS

| | | | |
|---|---|---|---|
| 2,579,321 | 12/1951 | Kadenacy | 60—39.39 |
| 2,660,858 | 12/1953 | Lichty | 60—39.19 |
| 2,928,242 | 3/1960 | Guenther | 60—39.39 |

MARK NEWMAN, Primary Examiner

A. D. HERRMANN, Assistant Examiner

U.S. Cl. X.R.
60—39.16, 39.43, 39.66